US007537539B2

(12) United States Patent
Antonov et al.

(10) Patent No.: US 7,537,539 B2
(45) Date of Patent: May 26, 2009

(54) MULTIPLE GEAR RATIO TRANSMISSION DEVICE

(75) Inventors: Roumen Antonov, Paris (FR); Frédéric Toutain, Senlis (FR); Cyrille Benais, Dammartin en Goele (FR)

(73) Assignee: Antonov Automotive Technologies B.V., Rotterdam (NL)

( * ) Notice: Subject to any disclaimer, the term of this patent is extended or adjusted under 35 U.S.C. 154(b) by 0 days.

(21) Appl. No.: 10/579,669

(22) PCT Filed: Nov. 18, 2004

(86) PCT No.: PCT/FR2004/002935

§ 371 (c)(1),
(2), (4) Date: May 17, 2006

(87) PCT Pub. No.: WO2005/050060

PCT Pub. Date: Jun. 2, 2005

(65) Prior Publication Data

US 2007/0111840 A1     May 17, 2007

(30) Foreign Application Priority Data

Nov. 18, 2003    (FR)   ................................. 03 13510

(51) Int. Cl.
*F16H 37/02*       (2006.01)
*F16H 37/06*       (2006.01)

(52) U.S. Cl. ...................................... 475/218; 475/329
(58) Field of Classification Search .................... 74/329, 74/331, 340; 475/207, 218, 219
See application file for complete search history.

(56) References Cited

U.S. PATENT DOCUMENTS

| 2,981,126 | A |   | 4/1961 | Kelley |
| 3,802,293 | A | * | 4/1974 | Winckler et al. ............... 74/745 |
| 4,468,980 | A | * | 9/1984 | Johansen ...................... 475/59 |
| 5,342,258 | A | * | 8/1994 | Egyed ......................... 475/281 |
| 5,584,775 | A |   | 12/1996 | Miura et al. |
| 5,735,376 | A |   | 4/1998 | Moroto et al. |
| 6,558,283 | B1 | * | 5/2003 | Schnelle ........................ 475/5 |
| 6,645,114 | B1 | * | 11/2003 | Biallas ....................... 475/271 |
| 6,811,508 | B2 | * | 11/2004 | Tumback ........................ 475/5 |
| 2003/0199360 | A1 |  | 10/2003 | Biallas |

FOREIGN PATENT DOCUMENTS

GB        2112883 A    *    7/1983
JP        03219152 A    *    9/1991

OTHER PUBLICATIONS

International Search Report issued Apr. 12, 2005 in PCT/FR2004/002935 (counterpart International application).

* cited by examiner

*Primary Examiner*—Tisha D Lewis
(74) *Attorney, Agent, or Firm*—Kenyon & Kenyon LLP

(57) ABSTRACT

The transmission device (1) comprises two power paths (8a, 8b) mounted in parallel, permanently connected to the upper shaft (2) of the engine (3) and the lower shaft (4) to control the differential (6). In each path (8a, 8b), each gear ratio Ia, IIa, IIIa or Ib, IIb, IIIb is obtained by activating a single activator capable of adapting the rotating speed between the two shafts 2 and 4 during gear ratio changes.

A control device (17) synchronizes the activations/deactivations during gear ratio changes, whether the newly activated gear ratio is in the same path or a different path.

12 Claims, 2 Drawing Sheets

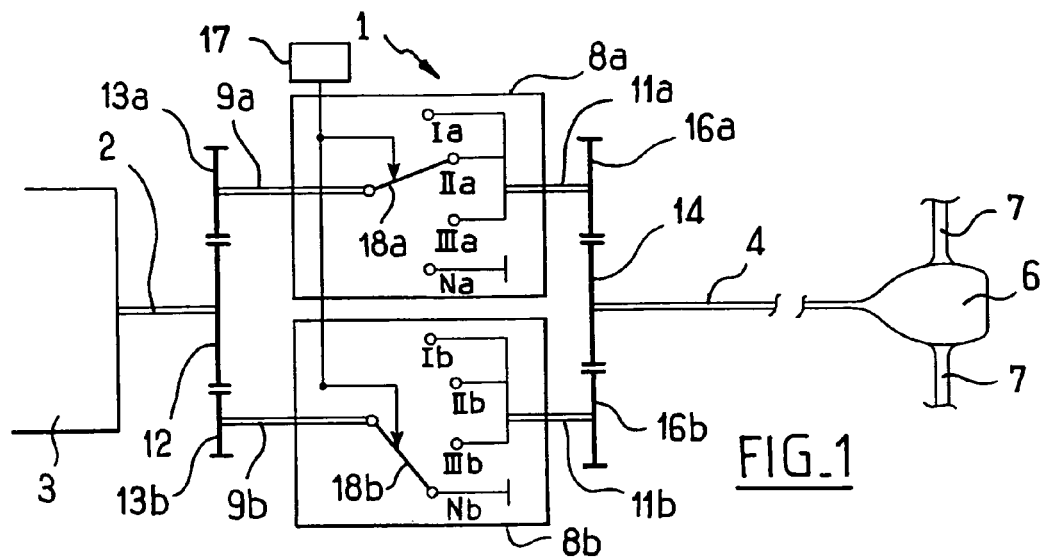
FIG_1
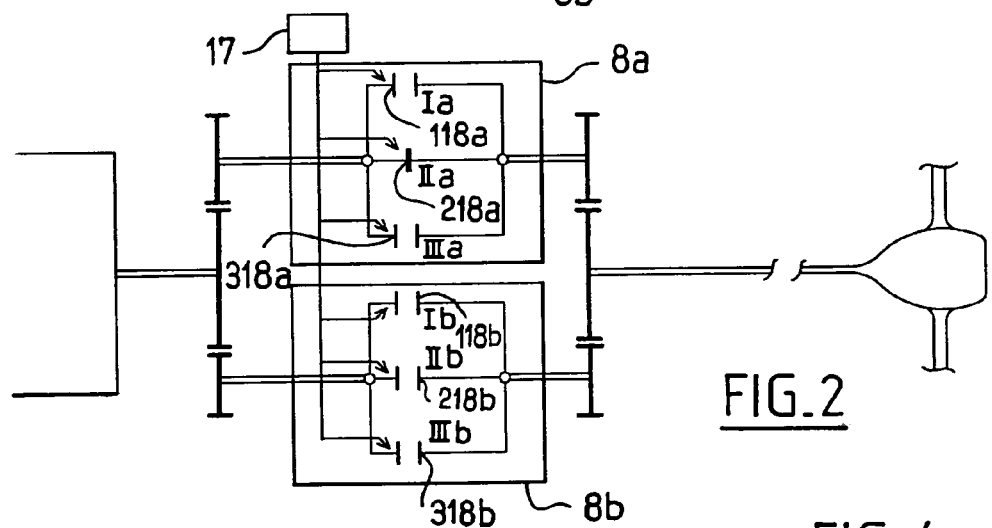
FIG_2
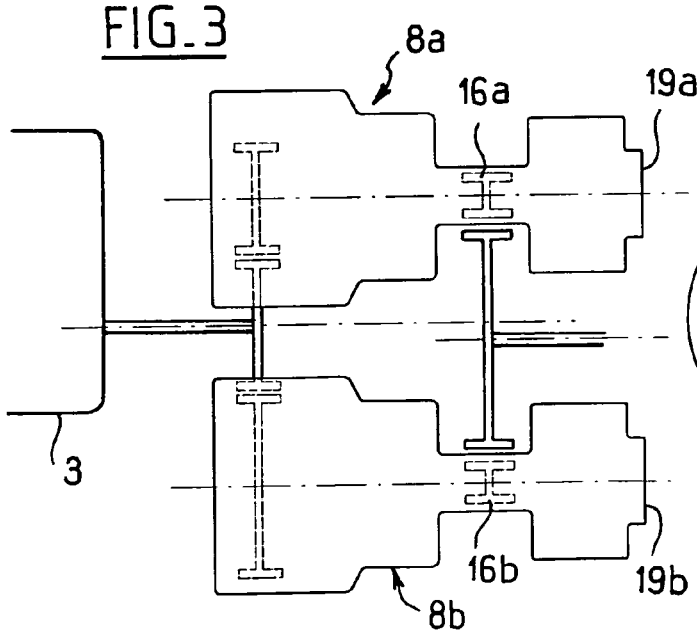
FIG_3
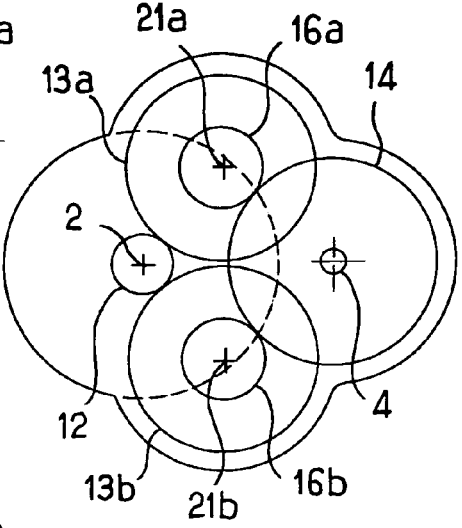
FIG_4

MULTIPLE GEAR RATIO TRANSMISSION DEVICE

This invention relates to a multiple gear ratio transmission device to connect an engine to a load such as a motor vehicle.

A transmission device of this type is known in which an upper shaft, connected to the engine, can be selectively connected to one of two countershafts by means of one or the other of two clutches. Each countershaft has idle gears with different diameters, with which said countershaft can be selectively coupled by means of dog-coupling or synchronisation devices. These idle gears permanently mesh with gears attached to a secondary shaft, which is shared by the two countershafts.

During operation, a single idle gear is coupled to each countershaft, but one of the two countershafts does not transmit any power as it is rotating independently of the engine because its input clutch is uncoupled.

To change gear ratio, controls couple or keep coupled to the deactivated countershaft the idle gear corresponding to the new gear ratio, and then the controls open the previously active input clutch and close the previously inactive input clutch, which simultaneously varies the rotating speed of the engine to adapt it to the rotating speed of the vehicle's wheels in accordance with the new gear ratio.

This device, recently installed on standard production vehicles, has been seen as a step forward for the user as the synchronisation time of the idle gear that has to be engaged or synchronised with its countershaft is no longer part of the period during which the transmission of power between the engine and the vehicle's wheels is interrupted.

However, it is felt according to the invention that this advantage is obtained at the cost of excessive drawbacks.

In particular, the device requires two input clutches instead of just one, two countershafts, highly complex control, great axial length of the device with almost no flexibility in terms of spatial design, very great weight and prohibitive expense.

Moreover, the known device does not directly allow for changing between two gear ratios that are defined by idle gears carried by the same countershaft.

Furthermore, in the field of conventional automatic transmissions, that is, comprising an axial series of planetary gear trains, the more recent transmissions exhibit an increasing number of gear ratios, with up to seven gear ratios currently available. This type of transmission also raises a problem of size, weight, complexity, cost and difficulty of installation in certain types of vehicle, particularly front wheel drive vehicles and especially vehicles with transverse engines.

The object of this invention is to at least partly rectify these drawbacks and thus propose a transmission device that can be simpler to design and/or to control, less bulky and/or easier to configure in space, easier to automate and with more flexible control.

According to the invention, the multiple gear ratio transmission device adapted to connect an engine to a load such as a motor vehicle, comprising:
- an upper shaft,
- a lower shaft,
  connected to each other by at least two power paths defining different gear ratios,
- on each power path, selective activators for each determined gear ratio, is characterised in that:
- the connection between the upper shaft and a respective input unit of each of the power paths is permanent; and
- the selective activators are of a gradual type and/or able to adapt the speed of the engine to the speed of the load.

According to the invention, the function to activate the gear ratio and the function to adapt the speeds of the upper shaft and the lower shaft of the transmission device are grouped together in a single selective activator.

Thus, there is now only one connection that is activated for all of the power paths at all times, unlike the device of the prior art, in which two connections were made on two different countershafts, but with only one connection being validated by the relevant one of the two input clutches.

According to the invention, the control sequence is simplified and corresponds to a normal sequence in the known automatic transmissions, typically with deactivation of a friction coupling such as a brake or a clutch and synchronised activation of another friction coupling.

Moreover, according to the invention, it is irrelevant whether the new gear ratio is obtained on the same power path as the previous gear ratio or on another path.

Other features and advantages of the invention will become apparent from the following description, which relates to non-exhaustive examples.

In the appended drawings:

FIG. 1 is a block diagram of the transmission device according to the invention;

FIG. 2 is a block diagram similar to FIG. 1, but with some additional details;

FIG. 3 is a general schematic view of an example of a transmission device according to the invention;

FIG. 4 is a diagrammatic end view of the device in FIG. 3; and

Figure 5:
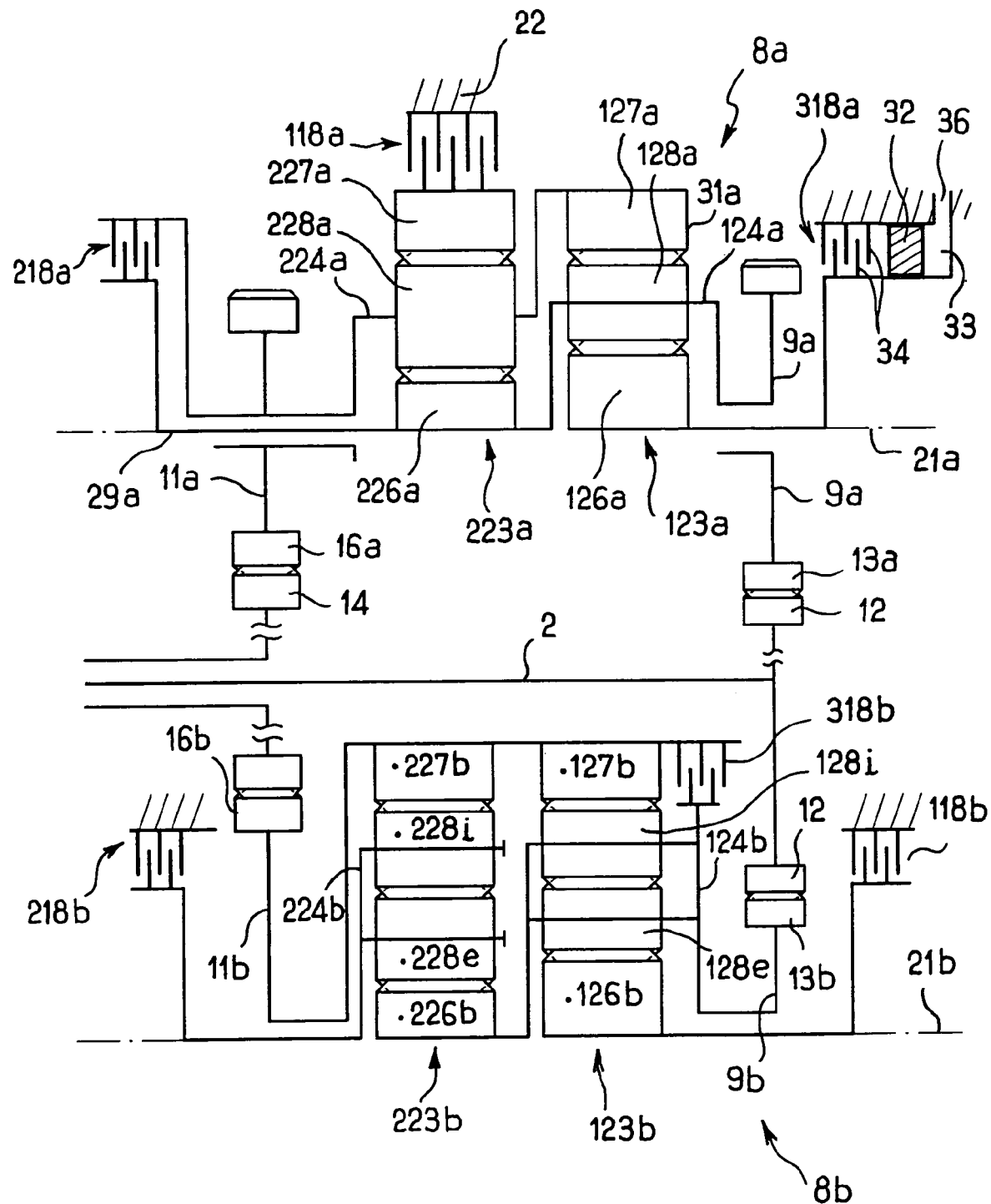
FIG. 5 is a diagram of another embodiment of the device according to the invention.

In the example shown in FIG. 1, the transmission device 1 is operatively mounted between an upper shaft 2, which in the example is the power shaft of a motor vehicle engine 3, and a lower shaft 4, which in the example is shown as the input shaft in a differential 6, the output shafts of which are the wheel shafts 7 of the vehicle.

The transmission device 1 connects the upper shaft 2 to the lower shaft 4 by two power paths 8a, 8b mounted mechanically in parallel. There is a permanent mechanical link between the upper shaft 2 and a rotary input unit 9a of the path 8a, and between the upper shaft 2 and a rotary input unit 9b of the path 8b.

Similarly, a rotary output unit 11a of the path 8a and a rotary output unit 11b of the path 8b are permanently mechanically connected to the lower shaft 4.

In the example shown in FIG. 1, these permanent connections are made by a gear 12 attached to the upper shaft 2, meshing with input gears 13a, 13b rotatably attached to the input unit 9a and 9b respectively, and by a gear 14 which is attached to the lower shaft 4 and which meshes with output gears 16a, 16b attached to the output unit 11a and 11b, respectively, for common rotation therewith.

In the example shown, the input gears 13a and 13b have different diameters so that the transfer ratio between the upper shaft 2 and the input unit 9a in the first power path 8a is different from the transfer ratio between the upper shaft 2 and the input unit 9b in the second power transmission path 8b. Conversely, the output gears 16a and 16b have the same diameter. This solution allows for different gear ratios to be obtained in the first power path 8a and the second power path 8b even if they are identical as suggested by the example shown in FIG. 1. It will however be seen below that the specific feature relating to the different transfer ratios is also of interest in situations where the two power transmission paths are not identical. As a variant, the input gears 13a, 13b can have identical diameters and the output gears 16a, 16b different diameters. It is also possible for the input gears and the output gears to have different diameters.

FIG. 1 shows, by analogy with a multiple position electric switch, that each of the power transmission paths 8a and 8b offers the possibility of choosing between three different gear ratios marked as Ia, IIa, IIIa and a neutral Na, and Ib, IIb, IIIb and Nb respectively.

The gear ratio between the input and the output of a power transmission path 8a or 8b is hereafter referred to as the "local gear ratio". The gear ratio of the transmission device in a given operating state corresponds to the local gear ratio in the path 8a or 8b that is not in a neutral position, as modified by the upper transfer ratio created by the upper gear 12 with the input gear 13a or 13b and the lower transfer ratio created by the output gear 16a or 16b with lower gear 14.

The local gear ratios of the two paths 8a, 8b can be identical from one path to the other, as the overall gear ratios will still be different due to the different transfer ratios. In particular, the two power transmission paths 8a and 8b can both have, as one of their local gear ratios, a direct drive ratio.

The two power transmission paths 8a, 8b are subject to a shared control device 17 that synchronises the gear ratio changes in the two power transmission paths 8a, 8b.

In the very schematic diagram in FIG. 1, the control device 17 acts on a selective activator 18a of the path 8a and 18b of the path 8b. Taking the example of the path 8a, the activator 18a selectively connects the input unit 9a with one of the three mechanical paths Ia, IIa, IIIa leading to the output unit 11a with a different local gear ratio, or with the neutral position Na corresponding to the cutting off of the transmission between the input unit 9a and the output unit 11a. The selective activator 18b has the same function in the path 8b as just described for the activator 18a, provided that the (a) suffixes of the reference numbers are replaced by (b) suffixes.

The operation of the device according to the invention will now be described in the very general example of FIG. 1.

To place the transmission device 1 in neutral, the two activators 18a and 18b are in their neutral positions Na and Nb respectively.

To connect the upper shaft 2 to the lower shaft 4 with an overall gear ratio corresponding to one of the six possible, the activator 18a or 18b of the path 8a or 8b with which the required gear ratio is associated is placed in the required position, for example IIa in the operating example in FIG. 1 in the path 8a, while the activator, 18b in the example shown in FIG. 1, of the other transmission path, 8b in the same example, is placed in its corresponding neutral position Nb. Thus, in the example, the power is transmitted via the transmission path 8a with the required overall gear ratio and the path 8b is inactive.

As will be seen in the more specific examples below, each selective activator 18a or 18b is not merely a dog or synchroniser, which would only be capable of being engaged or disengaged without any load, but a coupling, typically a friction coupling and more particularly a wet multi-disc coupling, capable of modifying the rotating speed of the engine shaft in accordance with the rotating speed of the vehicle's wheels during gear ratio changes, and also capable, at least for a starting gear of the vehicle (for example Ia), of starting off the rotation of the lower shaft 4 and therefore the forward movement of the vehicle from a situation in which the vehicle is stationary.

During a gear ratio change, the new gear ratio to be engaged typically corresponds to the placing in neutral of the power transmission path that was initially active, and the activation of a gear ratio in the power path that was initially in neutral. The control device 17 synchronises the actuation of the two activators 18a, 18b to minimise jerks and the period during which the transmission of power to the vehicle's wheels is interrupted. If necessary, the control device 17 can also be connected to the electronic management system of the engine 3 to regulate the engine power during the gear ratio change process.

It is also possible for a gear ratio change process to consist of changing from one local gear ratio to another in the same power transmission path, with the other power transmission path remaining in neutral.

The example shown in FIG. 2 differs from the example shown in FIG. 1 only in that the selective activators 18a and 18b have been replaced by a specific activator for each local gear ratio that can be obtained, namely 118a, 218a, 318a, 118b, 218b, 318b. These activators are shown as couplings, still as an example. Neutral is no longer shown as it is obtained by placing the three selective activators in the same power transmission path, for example 8b in the example shown, in an uncoupled state.

The control device 17 determines the state of each of the selective activators so that when the vehicle is running, one of the selective activators is always in a coupled state and all of the others are in an uncoupled state, with gear ratio changes being achieved by uncoupling the activator that was coupled until then, and switching another of the activators that was previously uncoupled to a coupled state, in a synchronised manner. Deactivation of the "old" activator can be progressive during progressive activation of the "new" activator in a sense that the driver of the vehicle will feel no interruption of the transmission of power to the wheels of the vehicle.

In the two examples that have just been described, and in the following examples, the two power transmission paths 8a and 8b are kinematically independent of each other, apart from of course the fact that their input units 9a, 9b mesh with the same upper gear 12 and their output units 11a, 11b mesh with the same gear 14 on the lower shaft 4. This specific feature distinguishes the invention from the transmission device of the prior art, in which both power paths pass through the same secondary shaft.

In the example shown in FIG. 3, each power transmission path 8a or 8b comprises a planetary gear train mechanism, for example of the type that will be described in detail below with reference to FIG. 5.

In this example, advantage is taken of the possibility offered by this type of mechanism to place the output gears 16a, 16b at a distance from the spatial end 19a, 19b of the mechanism. This is advantageous in certain installation scenarios of the engine-gearbox assembly in which the distance between the front end of the engine (left-hand end not shown in FIG. 3) and the output site of the transmission device must be minimised.

FIG. 4 illustrates the possibility of having at the corners of a quadrilateral the drive shaft or upper shaft 2, the lower shaft 4 diagonally opposite, and the two geometric axes 21a and 21b, also diagonally opposite, of the two paths 8a and 8b.

In the drawing in FIG. 5, only the upper half of the path 8a and the upper half of the path 8b can be seen. In this embodiment, the paths 8a and 8b have a differentiated structure to allow for better spacing of the gear ratios of the transmission device as a whole.

In the example shown in FIG. 5, the power path 8a comprises around a single shared geometric axis 21a in a housing 22 (partially shown), a first planetary gear train 123a and a second planetary gear train 223a, which respectively comprise:

first and second planet carriers 124a, 224a,
first and second sun gears 126a, 226a,
first and second internal ring gears 127a, 227a.

The planet carriers 124a, 224a rotatably hold planet pinions 128a, 228a that are eccentric relative to the general axis 21a, and each one of which meshes with the corresponding sun gear 126a or 226a and the corresponding ring gear 127a or 227a.

The first planet carrier 124a is attached to the input unit 9a and to the second sun gear 226a. The output unit 11a is attached to the second planet carrier 224a and to the first ring gear 127a.

The selective activators comprise:
a brake 118a associated with the second ring gear 227a, to selectively immobilise the ring gear;
a clutch 218a that joins the second planet carrier 224a and the second sun gear 226a, one connected to the output unit 11a and the other to the input unit 9a; and
a brake 318a to selectively immobilise the first sun gear 126a, thereby to impart to the first ring gear 127a and thus to the output unit 11a a speed which is multiplied by a certain gear ratio over the speed of the input element 9a.

The output 11a and its output gear 16a are located between on the one hand the two planetary gear trains 123a, 223a and on the other hand the selective coupling 218a. The output unit 11a is tubular and surrounds a shaft 29a connecting the clutch 218a with the second sun gear 226a. It can be seen from the drawing that the output 11a could have been placed between the planetary gear trains, or the first ring gear 127a could have been extended to the right beyond its current end 31a, thereby to carry there the output gear 16a which would then be axially juxtaposed to the input gear 13a near an axial end of the path.

The selective activators 118a, 218a, 318a are activated by hydraulic pistons 32 (see activator 318a) which are annular around the general axis 21a, and behind which is formed an annular chamber 33 for the pressurised oil, on the side remote from the discs 34. For the two activators 118a and 318a, which are brakes, the pressurised oil is carried into the corresponding chamber 33 by ducts 36 of the housing. For the activator 218a, which is a clutch, the pressurised oil arrives in the corresponding chamber (not shown) through a duct (not shown) formed in the shaft 29a.

With the general architecture that has just been described, the first local gear ratio, which is a local reduction ratio, is obtained by activating the brake 118a, thus immobilising the second ring gear 227a, and the power is transmitted from the input unit 9a to the output unit 11a by the second planetary gear train 223a. The brake 318a and the clutch 218a are released and the gears 126a, 127a, 128a of the first planetary train 123a are idling.

To obtain the second local gear ratio, which is a local direct drive gear ratio, the two brakes 118a, 318a are disengaged and the clutch 218a is engaged, so that the power is transmitted by the clutch 218a from the input 9a to the output 11a while all planetary gears 126a, 127a, 128a, 226a, 227a, 228a are idling.

For the third local gear ratio, the clutch 218a is disengaged and the brake 318a is engaged, with the brake 118a still being disengaged. The first sun gear 126a is now immobilised and the power is transmitted from the input unit 9a to the output unit 11a by means of the first planetary gear train 123a operating as an overdrive gear, i.e. a gear causing the output unit 11a to rotate at a higher speed than the input unit 9a. The gears 226a, 227a, 228a of the second planetary gear train 223a are idling.

The path 8b also contains two planetary gear trains 123b and 223b, but the planet pinions are mounted in pairs 128i and 128e, 228i and 228e, each pair forming a mechanical series between the sun gear 126b or 226b and the ring gear 127b or 227b.

The two ring gears 127b and 227b are attached to each other and to the output unit 11b. The first planet carrier 124b is attached to the input unit 9b and to the second sun gear 226b.

To obtain the first local gear ratio, a brake 118b selectively immobilises the first sun gear 126b. To obtain the second local gear ratio, a brake 218b selectively immobilises the second planet carrier 224b.

To obtain the third local gear ratio, which is a direct drive gear ratio, a clutch 318b selectively connects the input unit 9b and the output unit 11b to each other.

With this transmission device, and with a more reductive transfer ratio between the upper shaft 2 and the input unit 9a in the first path 8a than between the upper shaft 2 and the input unit 9b in the second path 8b, the following combination is obtained, for example:
first overall gear ratio with the first local gear ratio of the first path 8a;
second overall gear ratio with the first local gear ratio of the second path 8b;
third overall gear ratio with the second local gear ratio of the second path 8b;
fourth overall gear ratio with the local direct drive of the first path 8a;
fifth overall gear ratio with the local direct drive of the second path 8b; and
sixth gear ratio with the third local gear ratio (overdrive) of the first path 8a.

In this embodiment, the two planetary gear trains 123a, 223a and the clutch 218a of the path 8a are three power sub-paths which are operatively in parallel and activated in turn, between the input element 9a and the output element 11a. Similarly the two planetary gear trains 123b, 223b and the clutch 218b of the second path 8b are three sub-paths arranged operatively in parallel between the input element 9b and the output element 11b. Each sub-path is activated and deactivated by the coupling and uncoupling, respectively, of a single coupling means.

The structure of a transmission device with three sub-paths such as two planetary gear trains and a clutch, in which each gear ratio of the overall structure is obtained by activating a single selective coupling is particularly advantageous in the context of the invention as the control of each power path 8a or 8b is thus considerably simplified, which also simplifies the synchronisation of the controls applied to the two paths 8a and 8b.

More particularly, to switch from one gear ratio to another, an activator such as 118, 218 or 318 must simply be disengaged, and another such activator must simply be activated, either in the same path or in the other path.

Of course, the invention is not limited to the examples described and shown.

Provision could be made for more than two power transmission paths.

For example, a third path could be made up of direct drive between the upper shaft 2 and the lower shaft 3.

Paths like 8a and 8b can be produced, but even easier to control with just one brake for each local gear ratio, i.e. with no clutches at all. However, as the braked unit would systematically act as a reaction member engaged by another gear unit, there would no longer be a local direct drive gear ratio.

The invention claimed is:

1. A multiple gear ratio transmission device, adapted to connect an engine to a load such as a motor vehicle, comprising:
   an upper shaft,
   a lower shaft,
   at least two power paths which are each capable of interconnecting the upper shaft and the lower shaft, wherein each power path comprises at least two power sub-paths, each of which defines a respective transmission ratio between the upper shaft and the lower shaft,
   for each power sub-path, one respective selective gradual activator able during engagement process to match the engine speed and load speed with each other, there being provided an equal number of power sub-paths and of selective gradual activators,
   wherein each power sub-path is uninterruptible between the upper shaft and the lower shaft except by disengagement of its respective gradual selective activator.

2. A device according to claim 1, characterized in that the selective gradual activators are wet multi-disc friction couplings.

3. A device according to claim 1, characterized in that at least some of the selective gradual activators are brakes that selectively connect a reaction member to a housing of the transmission device.

4. A device according to claim 1, characterized in that each power path is kinematically independent and comprises an output unit permanently connected to the lower shaft.

5. A device according to claim 1, characterized in that the two power paths are approximately identical and are capable of obtaining between their input unit and their output unit identical local gear ratios, but are connected to the upper shaft and/or the lower shaft with a different transfer ratio.

6. A device according to claim 1, characterized in that each power path is capable of a local direct drive gear ratio.

7. A device according to claim 1, characterized in that each power path is placed in neutral when all of the selective gradual activators of the power path are in a disengaged state.

8. A device according to claim 1, characterized in that at least one of the power paths comprises at least one planetary gear train.

9. A device according to claim 1, characterized in that at least one of the power paths comprises first and second planetary gear trains, respectively comprising:
   first and second planet carriers, in which planet pinions are mounted in pairs in series,
   first and second sun gears,
   first and second ring gears,
   in that:
      the two ring gears are attached to an output unit of the power path,
      the first planet carrier and the second sun gear are attached to an input unit of the power path,
   and in that the selective gradual activators comprise:
      a brake for the first sun gear,
      a brake for the second planet carrier,
      a direct drive clutch.

10. A device according to claim 1, characterized in that at least one of the power paths comprises first and second planetary gear trains, respectively comprising:
    first and second planet carriers,
    first and second sun gears,
    first and second ring gears,
    in that:
       the first ring gear and the second planet carrier are attached to an output unit of the power path,
       the first planet carrier and the second sun gear are attached to an input unit of the power path,
    and in that the selective gradual activators comprise:
       a brake for the second ring gear,
       a brake for the first sun gear
       a direct drive clutch.

11. A device according to claim 1, characterized in that at least one of the input units and output units on each path is located in an intermediate position between the spatial ends of the path.

12. A device according to claim 1, characterized in that it comprises controls capable of synchronizing the gradual placing of a selective gradual activator in a neutral state with the gradual placing of another selective gradual activator in an activated state.

* * * * *